United States Patent
Coale et al.

[11] Patent Number: 6,148,352
[45] Date of Patent: Nov. 14, 2000

[54] SCALABLE MODULAR DATA STORAGE SYSTEM

[75] Inventors: Jerry Lee Coale, Watsonville; Steven VanGundy, Gilroy, both of Calif.

[73] Assignee: International Business Machines Corporation, Armonk, N.Y.

[21] Appl. No.: 08/997,962

[22] Filed: Dec. 24, 1997

[51] Int. Cl.[7] .................................. G06F 1/16; H05K 7/10
[52] U.S. Cl. ..................... 710/100; 710/101; 710/103; 361/725; 361/727
[58] Field of Search ..................... 361/727, 725; 395/280, 281; 710/100, 101, 103

[56] References Cited

U.S. PATENT DOCUMENTS

| | | | |
|---|---|---|---|
| 4,158,235 | 6/1979 | Call et al. | |
| 4,356,550 | 10/1982 | Katzman et al. | |
| 5,195,022 | 3/1993 | Hoppal et al. | 361/391 |
| 5,243,493 | 9/1993 | Jeng et al. | 361/690 |
| 5,471,099 | 11/1995 | Larabell et al. | 307/53 |
| 5,515,239 | 5/1996 | Kamerman et al. | 361/727 |
| 5,604,662 | 2/1997 | Anderson et al. | 361/685 |
| 5,737,189 | 4/1998 | Kammersgard et al. | 361/726 |
| 5,761,032 | 6/1998 | Jones | 361/685 |

*Primary Examiner*—Ayaz R. Sheikh
*Assistant Examiner*—Rupal D. Dharia
*Attorney, Agent, or Firm*—Esther E. Klein; Noreen A. Krall

[57] ABSTRACT

A storage system is provided for storing data for a computer system where the storage capacity can be incrementally increased without disrupting the operations of the storage system. The storage system comprises a base unit, and a plurality of modular units. The modular units are inserted into the system as increased storage capacity is required. Each modular unit has an enclosure comprising top, bottom, and side walls. The bottom and top walls each have at least one power connector and data transmission connector. The bottom wall of a first modular unit enclosure attaches to the base unit enclosure and the top wall of the first modular unit enclosure can attach to the bottom wall of a second modular unit enclosure. At least one back plane is provided in each modular unit for providing attachment for a set of storage devices. A data transmission interconnect system is provided for transmitting data and commands between the plurality of storage devices in the modular units and an external source, such that in the event of a loss of connection to any one set of storage devices data and commands can still be transmitted from and to any other set of storage devices.

8 Claims, 9 Drawing Sheets

SCALABLE MODULAR DATA STORAGE SYSTEM

FIELD OF THE INVENTION

This invention relates to the field of data storage subsystems and more particularly to scalable modularized storage subsystems.

BACKGROUND OF THE INVENTION

In recent years there has been substantial growth in the use of disk drive arrays for storing large quantities of electronic data for computer systems. A disk array typically comprises a set of direct access storage devices (DASDs) such as hard disk drives (HDDs) acting in concert connectable to a host computer system. The disk array is managed by software either residing wholly or partially on the host system or in a separate array controller. A disk array is designed to provide high capacity data storage, high reliability and high data transfer rates to and from the host computer system.

Application programs running on a host system issue requests to access data stored on the storage devices which are routed through an I/O bus adapter. An I/O bus itself is the medium in which host commands, disk responses, and data are moved between adapters and the storage devices. A disk controller connects a host computer's I/O bus to the storage device I/O bus through a bus adapter channel. Examples of I/O buses are the Small Computer Storage Interconnect (SCSI), the Serial Storage Architecture (SSA), and the Fibre Channel Arbitrated Loop (FC-AL).

Storage subsystems also include power converters. Power from commercial AC power sources needs to be converted to DC power and further converted to supply the amount of power needed for the HDDs as well as cooling fans also provided in the subsystem. Typically redundancy is required in all aspects of the storage system, including the HDDs as well as fans and power converter systems.

Customers using storage subsystems often require incremental growth of the storage capacity of the system. That is, a customer's computer system may start out only needing a certain limited amount of data storage capacity. But, after continuous use and as the customer's enterprise activity grows, the customer may need to be consistently increasing the amount of data storage capacity available to the computer system.

At the same time, customers are also concerned about the amount of floor space used by the data storage system and how that floor space corresponds to the amount of storage capacity actually being used. It is not desirable for customers to spend more money or make available more floor space than the amount of storage capacity that is currently required. However, it is also not desirable to purchase completely new systems as the enterprise's storage needs grow.

One approach to anticipating an enterprise's ultimate storage needs is to use a storage subsystem which incorporates a rack enclosure which can accommodate a fixed number of drawers of HDDS. A customer can start out with two or three drawers of HDDs and continually add drawers as additional storage capacity is required. However, such a solution does not minimize the floor space that is required to accommodate a rack type enclosure that ultimately includes ten or twenty drawers. That is, a maximum size enclosure solves the problem of incremental growth but introduces other considerations for the customer and storage vendor.

Using this approach also results in a higher dollar per mega byte for a minimum configuration. This is caused by the up-front hardware costs associated with the enclosure cables, back planes and power systems needed for incremental growth.

Customers also require that the storage subsystems be continually available. Therefore, there is a need for a storage system where the storage capacity can be incrementally increased without disrupting the customers access to the data currently being stored on the system.

SUMMARY OF THE INVENTION

It is an object of the invention to provide a storage subsystem having an incrementally upgradable storage capacity subsystem. It is a further object to provide such a subsystem where the addition, removal, or maintenance of any storage units or components can be accomplished without disturbing the operation of the other components of the subsystem.

To accomplish these objectives a storage system is provided for storing data for a computer system. The storage capacity of the storage system can be incrementally increased without disrupting the operations of the storage system. The storage system comprises a base unit, and a plurality of modular units. The modular units are inserted into the system as increased storage capacity is required. Each modular unit has a top, a bottom, and side walls. The bottom and top of each modular unit have at least one power connector and at least one data transmission connector. The bottom of a first modular unit connects to the base unit and the top of the first modular unit is connectable to the bottom of a second modular unit. At least one back plane is provided in each modular unit for providing attachment for a set of storage devices. Each storage device has a storage media in which data is stored. A data transmission system is provided for transmitting data and commands between the plurality of storage devices in the modular units and the computer system, such that in the event of a loss of connection to any one set of storage devices data and commands can still be transmitted from and to any other set of storage devices.

A power system is also provided for powering a plurality of storage devices in each modular unit, and connecting each modular unit with an external power source. The data transmission system and power system interconnect each modular unit such that at least one new modular unit can be added to the storage system to increase storage capacity without disrupting operations of the storage system.

In a preferred embodiment the data transmission system comprises serial buses configured according to the serial storage architecture (SSA).

In a further preferred embodiment, the power system includes dual power converters and the system includes redundant fans and other redundant components.

DETAILED DESCRIPTION OF THE PREFERRED EMBODIMENT

Figure 1:
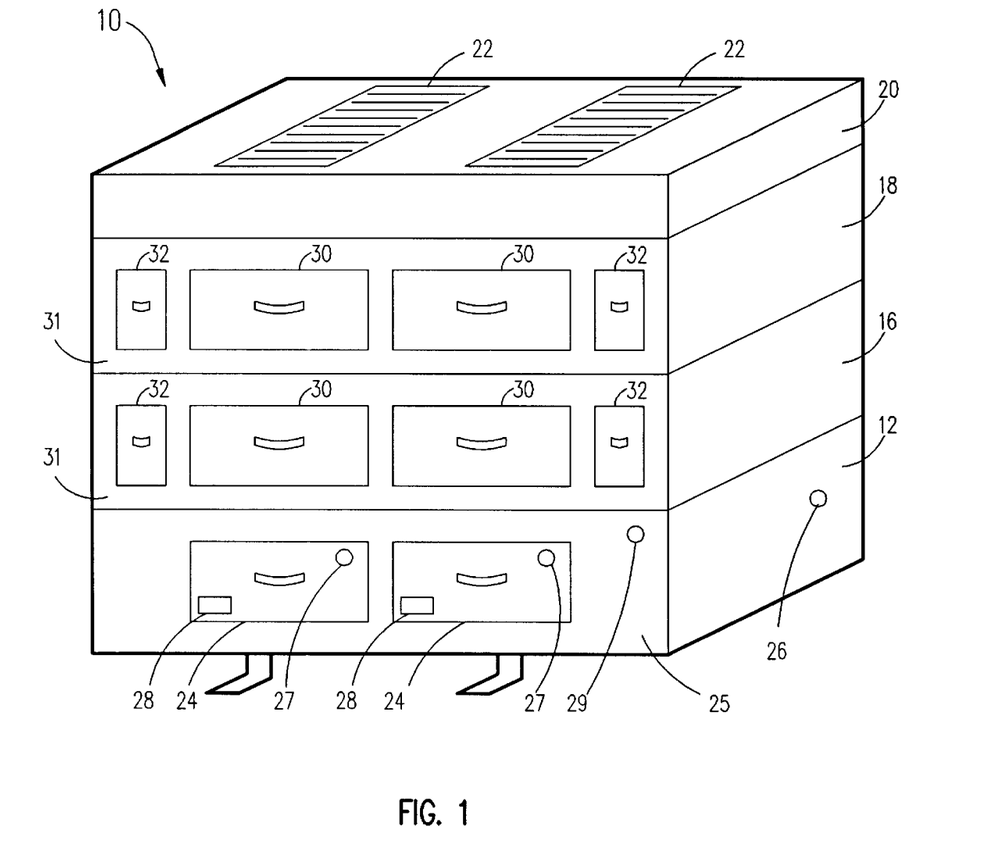
FIG. 1 is a front perspective view of the modularized storage system.

FIG. 1 shows a front view of a storage system 10 comprising multiple modular units according to the preferred embodiment of the invention. A base unit 12 is at the bottom of the multiple modular units and supports the other units. The base unit 12, as will be described in further detail, comprises an enclosure containing a dual power source, providing power to the attached storage modules 16 and 18 and dual cooling fans. On top of the base unit is a first storage module 16 which comprises an enclosure having a bottom wall interfacing with a top wall of the base unit enclosure.

As will be described in more detail, each storage module contains two sets of disk drives for storing data along with the electronics for operating the disk drives. Each storage module also contains fans for cooling the module and further power converters for bringing the power to the disk drives. Each storage module has connectors on the bottom wall to receive power lines, data lines, and fault sensor data lines from the unit below and connectors on the top of the unit to send power lines, data lines, and fault sensor lines to the unit above.

As shown in FIG. 1, a second modular storage unit 18 is connected on top of the first modular storage unit 16. The power lines, data lines and fault detection sensor lines enter into the second storage module from the first storage module through connectors. The second storage module is connected to a cover unit 20. The cover unit 20 is where the fault sensor lines are connected to status indicators 22 to give general system status.

Two removable panels 24 on the front wall 25 of the base unit 12 provide access to a first and second AC to DC power converter supply. The storage system does not have to be disassembled in order to access and replace one of these power converter units. A power input connector 26 on each of the side walls connects to an end power convertor AC cable supplying external power. Each panel has an indicator light 27 which is used to alert operators that power is being supplied to each side of the storage system through the power converter units. Each panel also includes an on/off switch 28 for turning on and off the power units. An emergency power off switch 29 is also provided for the base unit to quickly remove the power in the event of an emergency.

Two removable panels 30 on the front wall 31 of the modular storage units 16 and 18 provide access to the two sets of disk drives. The panels 30 enable access to the drives without requiring the removal of the modular unit from the storage system. There are also two smaller removable panels 32 which allow access to redundant power units supplying power for each set of disk drives and fan system.

Figure 2:
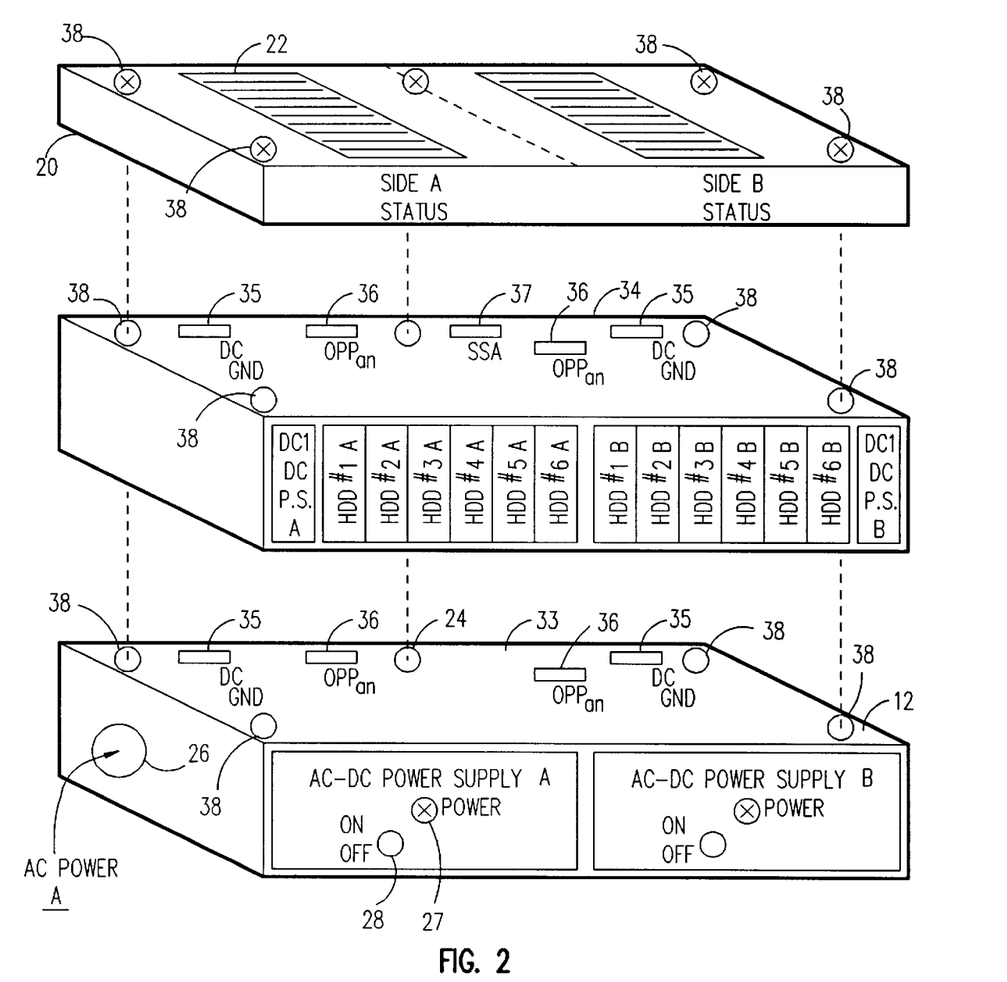
FIG. 2 is a top perspective view of the separate units showing connections between the units.

FIG. 2 is a top view of the storage system modules with the front panels removed, and showing the connectors linking the storage module to the base unit, to each other, and to the cover unit. While only one storage module is shown in FIG. 2, it can be appreciated that more storage units can be attached. Also, as shown in FIG. 2, each modular storage unit has two sets of six HDDs and two AC to DC power systems. Different configurations are also contemplated by the invention.

On the top wall 33 of the base unit 12 (and the top wall 34 of each storage module 16), there are two DC bulk power supply and power line connectors 35 on each side of the units. Status line connectors 36 provide status on the power in the base unit and status on the storage devices in each of the storage modules up through each of the units to the cover unit.

As shown in FIG. 2, a data transmission connector 37 is provided on the top wall of each storage module for transmitting data between both sets of storage devices in each storage module to the adjacent storage module on top.

The cover unit 20 receives the status information and sends it to the operator panel 22. As shown in FIG. 2, there are two sets of 8 rows of status indicators 22 for up to 8 storage modules in the storage system (though more can be provided). The status indicators also provide status information on the HDD activity, HDD faults, and power indicators.

Also shown in FIG. 2 are the module interlocks 38 which securely lock the units together. There are many variations of implementation known to those skilled in the art for such interlocking mechanism such as clasps to securely close the units. It is also well known to those skilled in the art to provide connectors 35, 36, and 37 that are easily attachable. Also, though not shown in this figure, it will be appreciated by those skilled in the art that the bottom walls of the storage module have reciprocal connectors receiving the connectors from the unit below so that the systems can be auto-docked.

Figure 3:
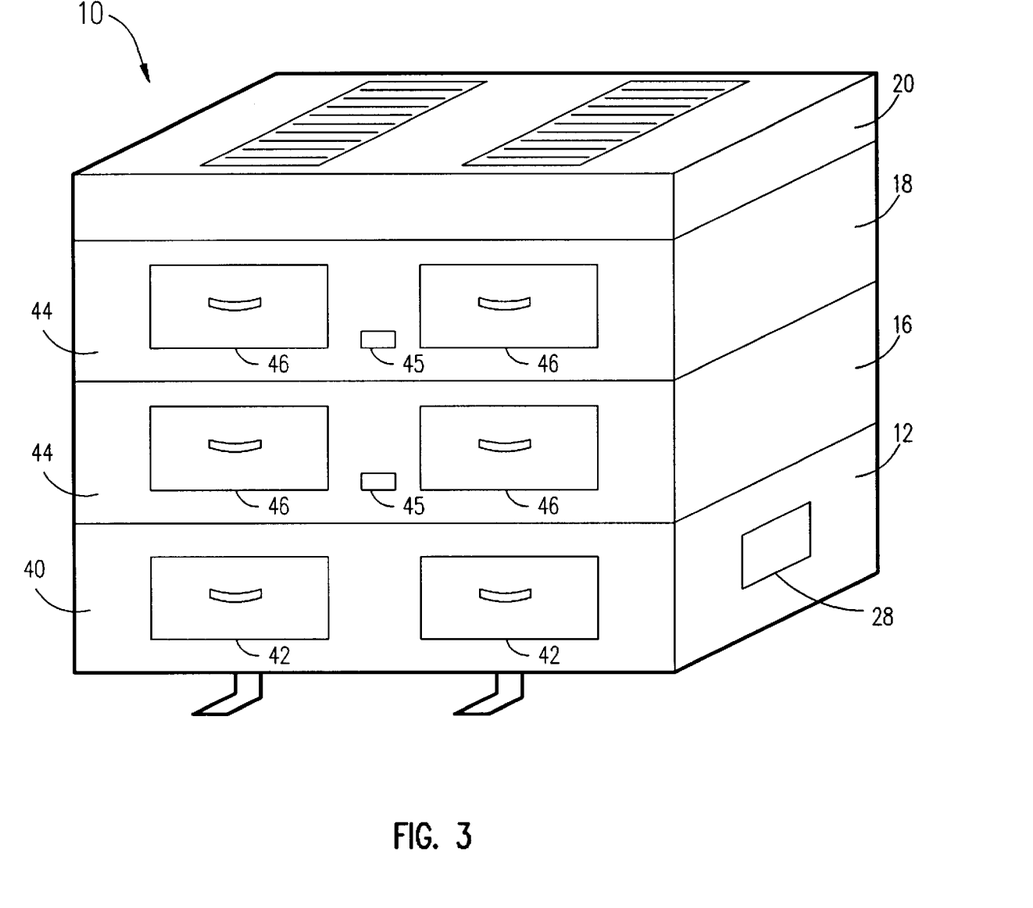
FIG. 3 is a back perspective view of the system of FIG. 1.

FIG. 3 shows the back view of the storage system 10 comprising the modular storage units 16 and 18, the base unit 12 and cover unit 20. The back wall 40 of the base unit 12 has two removable panels 42 which allow access to redundant fan assemblies without having to remove the unit from the storage system. On the back wall 44 of each storage module 16 and 18 there likewise are removable panels 46 which allow access to redundant fan units in the storage modules. There is also an opening 45 in the back wall 44 of the storage modules for receiving data transmission lines from an external computer system.

In one preferred embodiment only one of the modular units will be directly connected to an external data system. Data lines from a computer system enter the back of the first storage module through the opening 45 and the connector for the data transmission lines on the bottom of the first storage module will not be used. The other storage units have openings 45 for receiving data from the computer system but are not used. Alternatively, one or more host computer systems can be hooked up in through each separate storage module. That is, storage modules can be designated for separate computer systems or two or more storage modules can provide storage for the same host system. An SSA switch provides the ability to switch in or out host systems, as will be described in greater detail.

As shown in FIGS. 1–3, all the modules are interchangeable and there is no special initial storage unit that is connected to the base unit. As is also well known to those skilled in the art, one alternative to the units described would be, for example, to have a special unit for the first storage unit which receives the data from the computer system and the other modules being interchangeable.

Figure 4:
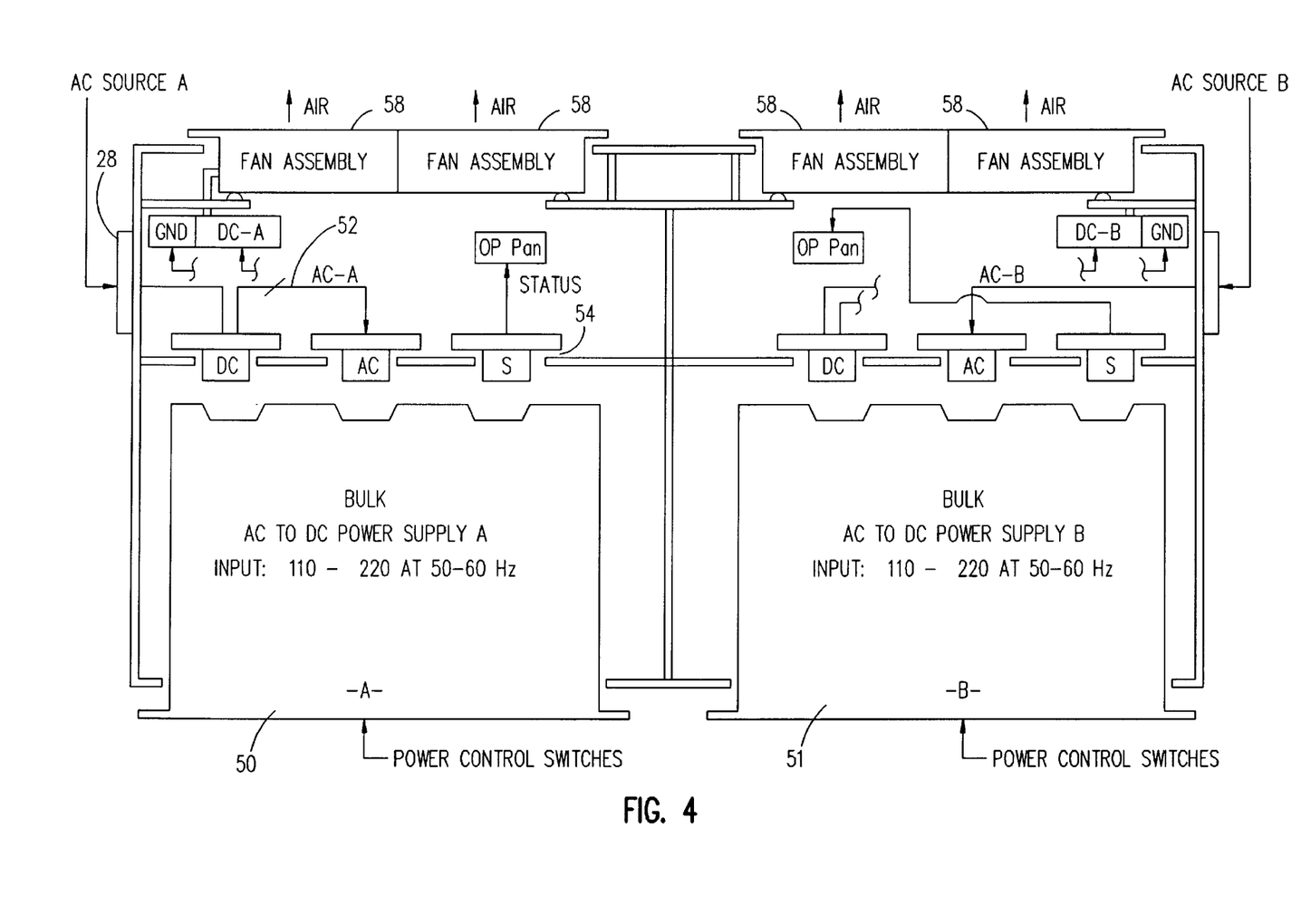
FIG. 4 is a top view of a base unit.

The base unit 12 will be described in more detail with reference to FIG. 4. In keeping with the dual component aspect of the storage system, there are two power supplies—A and B 50, 51 in the base unit. Each power supply is an AC to DC power supply which gets an input of 110 to 220 volts at 50 to 60 hertz and outputs unregulated DC power of, for example, 36 or 300 voltage. A DC connector 50 outputs the power and an AC connector 52 receives the power from the outside source at 28. A status signal line 54 gets transmitted to the operator panel in the cover unit.

The power supplies A and B are removable from the front plane of the base unit and can be removed and replaced without disturbing the rest of the assembly. Each power supply is connected up to a dual fan assembly 58 on each of the two sides of the storage system. The fan assembly 58 on the back of the storage system also has panels (42 in FIG. 3) for removing and replacing the assemblies and panels without disturbing the rest of the system. The fan assemblies 58 transmit the air from the outside and send it through to cool the components of the system.

Each of the storage modules will be described in greater detail with referenced FIG. 5. Each storage module has two sets of storage devices 60 and two backplanes 62 into which the storage devices are connectable. The backplane will be described in more detail later. The backplane provides the data transmission and power interface to the hard disk drives.

Figure 5:
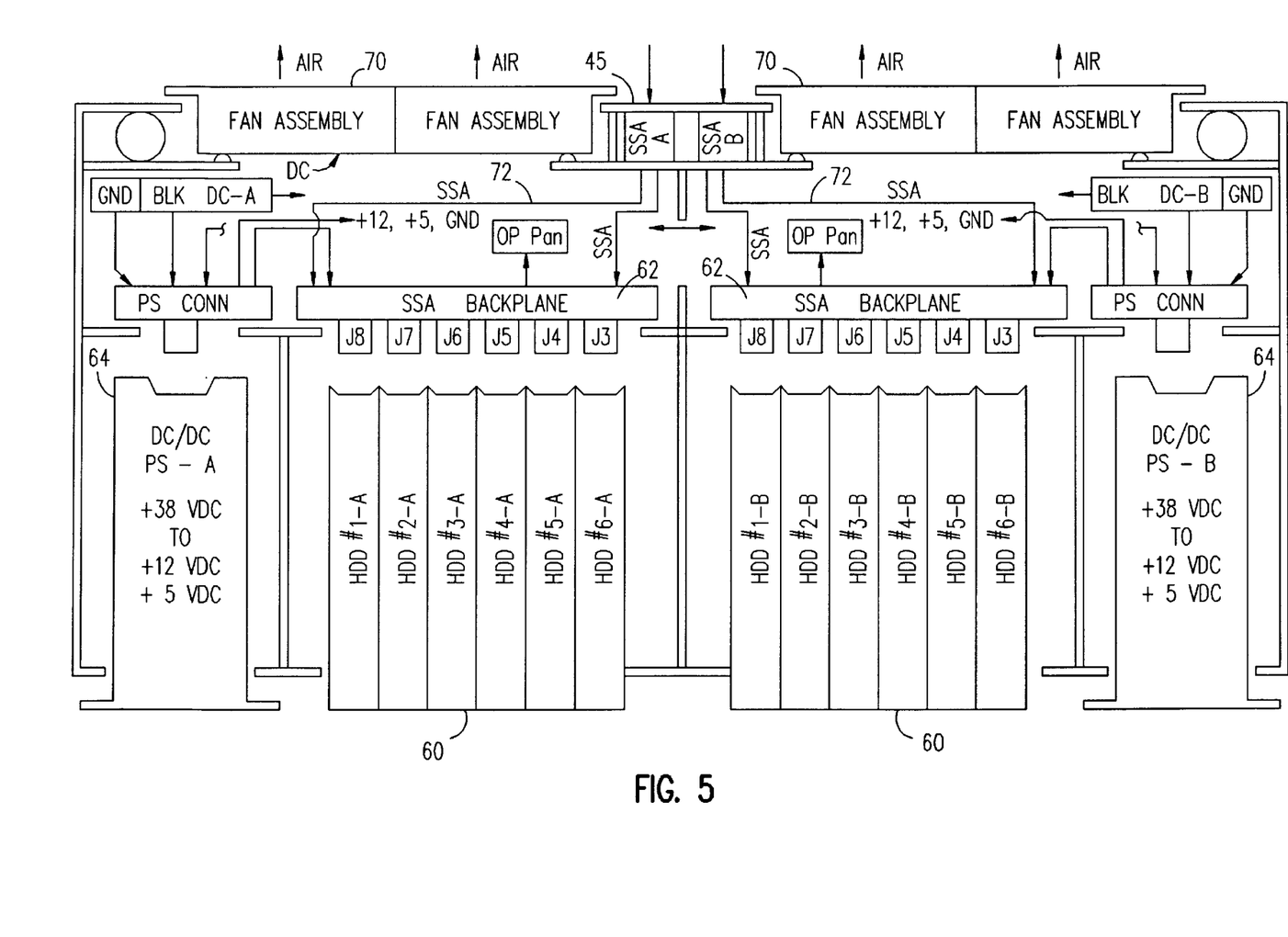
FIG. 5 is a cutaway top view of a modular storage unit.

As shown in FIG. 5, there are six disk drives attached to each backplane. Each set of disk drives can be controlled as separate RAID systems. Each of the disk drives can be removed from the front plane of the storage module without disturbing the operation of the rest of the system through the panels (30 in FIG. 1) described previously. Also provided on each side of god the storage modules is a power supply 64 which is a DC to DC converter which converts unregulated bulk DC (such as 38 volts) to regulated DC power such as 5, 12, or 3.5 volts used by the disk drives. As shown in FIG. 5, storage units contained in the storage module are disk drives which magnetically store electronic data. Other storage devices may also be used.

The power supplies 64 on each side of the storage module are connected to the disk drives and transmits the power needed for the operation on each of the sides. Also provided on each side are dual fan assemblies 70 for cooling each side of the system. The removable panels (46 in FIG. 3) on the back wall of the storage module allows for access to and replacement of the fan assemblies. Each storage module has data transmission in and out connectors 72 which connects the disk drives on each side of the module through the back plane 62. As shown in FIG. 5, there are two SSA loops A and B for the two sides of the storage module. The disk drives in each module get connected together through the system to storage disk drives in the other storage modules through the data transmission connectors. The opening 45 connects to the data transmission input to receive data and commands input from an external source. The data transmission input provides the data and commands for transmitting the data between the computer system and the storage devices.

The data and command transmission connectivity between the host computer and the disk drives is preferably implemented using the serial storage architecture (SSA). The SSA architecture is under development by the American National Standards Institute ANSI X3T 10.1 and is an interface designed to connect an external attachment device such as disk drive or tape drive to work station servers, host systems, and other storage subsystems.

In accordance with the SSA architecture, the link between the host system and the disk drives is a serial link providing a communication path for serialized data. Full duplex communication over the link is provided to allow rapid transmission of data between the components of the system. SSA transmits the data in a loop configuration where there are two communication paths to each drive. This allows for either double bandwidth to each drive in the loop or an alternate route to a drive when connection has failed. SSA provides a two-signal connection transmit and receive providing full two-plex communication. The serial connection between the host computer and the storage devices consists of four wires used to communicate frames of information. The four lines consist of a plus/minus line out to transmit and a plus/minus line in to receive. A port, referred to as a gateway, resides in each of the disk drives and hosts, and consists of hardware and firmware to support one end of a link, which is one transmit path and one receive path. A port in SSA is capable of maintaining two conversations at any one time, one inbound and one outbound. Usually each disk drive and host uses SSA dual port nodes which are capable of carrying on four simultaneous transmissions for a total of 80 megabytes per second. A port in one node connects to a port in another node via a link. A gateway is established between the two nodes to provide full duplex communication over the SSA network. As a brief overview of the SSA function capabilities, a node issues a transaction to another node to perform a function, such as accessing the disks. A master builds a master control block and the slave receiving the transaction receives the transaction frames and builds a task control block which calls an address service. If a connection is broken between any nodes the commands and data can still be transmitted over other connecting links.

SSA uses the logical aspects of the SCSI (small computer system interface) specifications for addressing the serially attached disk drives. These SCSI specifications are mapped to the physical specifications of SSA. SSA can be used as a transport layer for various upper layer protocols, in particular SCSI 2 for storage devices. SCSI 2 and SSA maintain a similar address scheme as defined in the SCSI-2 standard where there are initiators, targets, and logical units.

Figure 6:
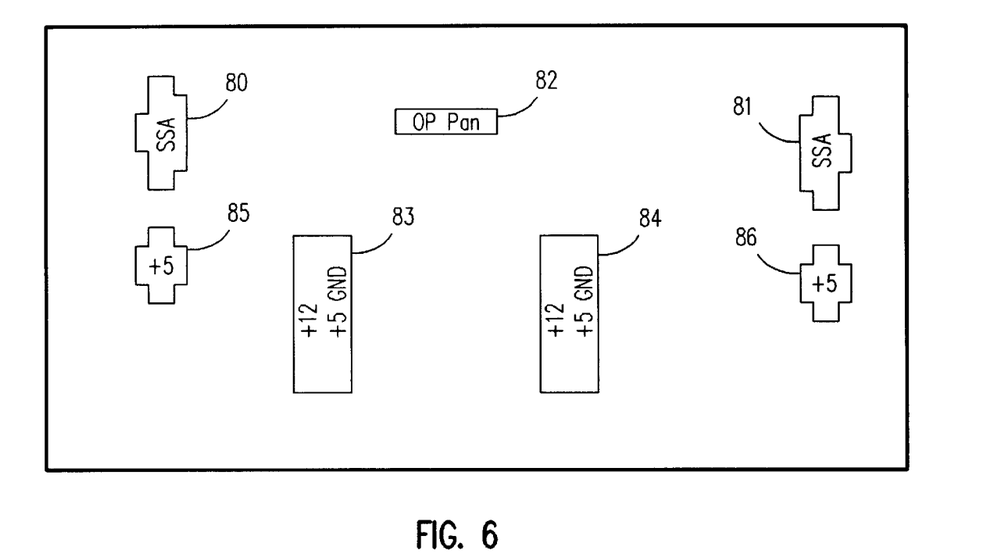
FIG. 6 is a bottom view of a back plane.

FIG. 6 shows a back side of a back plane where the connectors 80 and 81 are provided for the connections to each side of the SSA loop, connectors 82 for the fault sense lines connections up to the operator panel, connectors 83 and 84 for grounding the power supply, and connectors 85, 86 for the regulated DC power.

Figure 7:
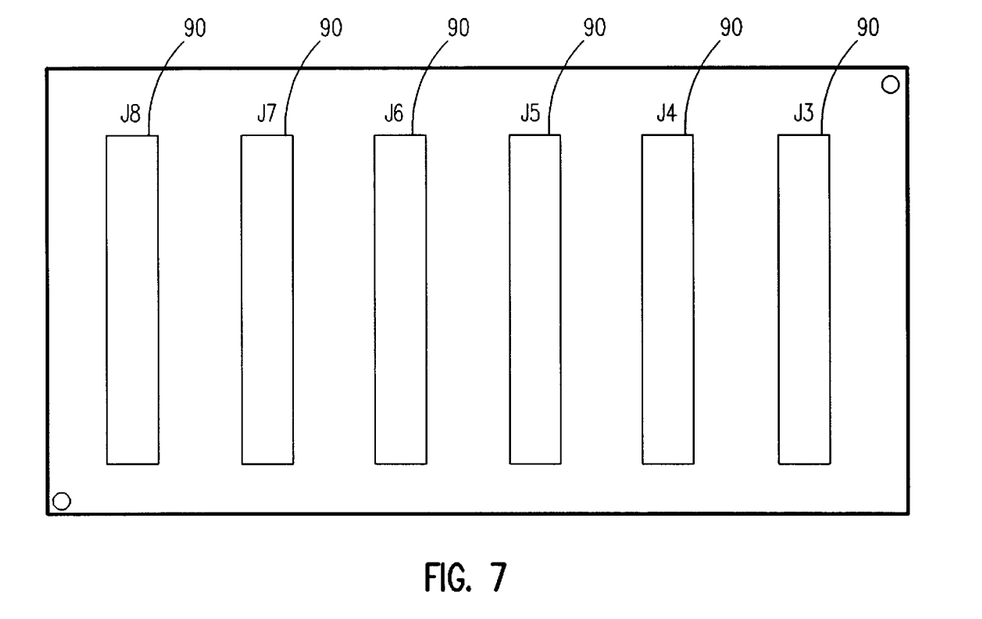
FIG. 7 is a top view of a back plane.

FIG. 7 shows the front side of the back plane that connects into the HDDs through slots 90. Other wiring is used to transmit the SSA connection from the back plane through the SSA connector to the other storage modules. The connections to the back plane are well known to those skilled in the art.

Figure 8:
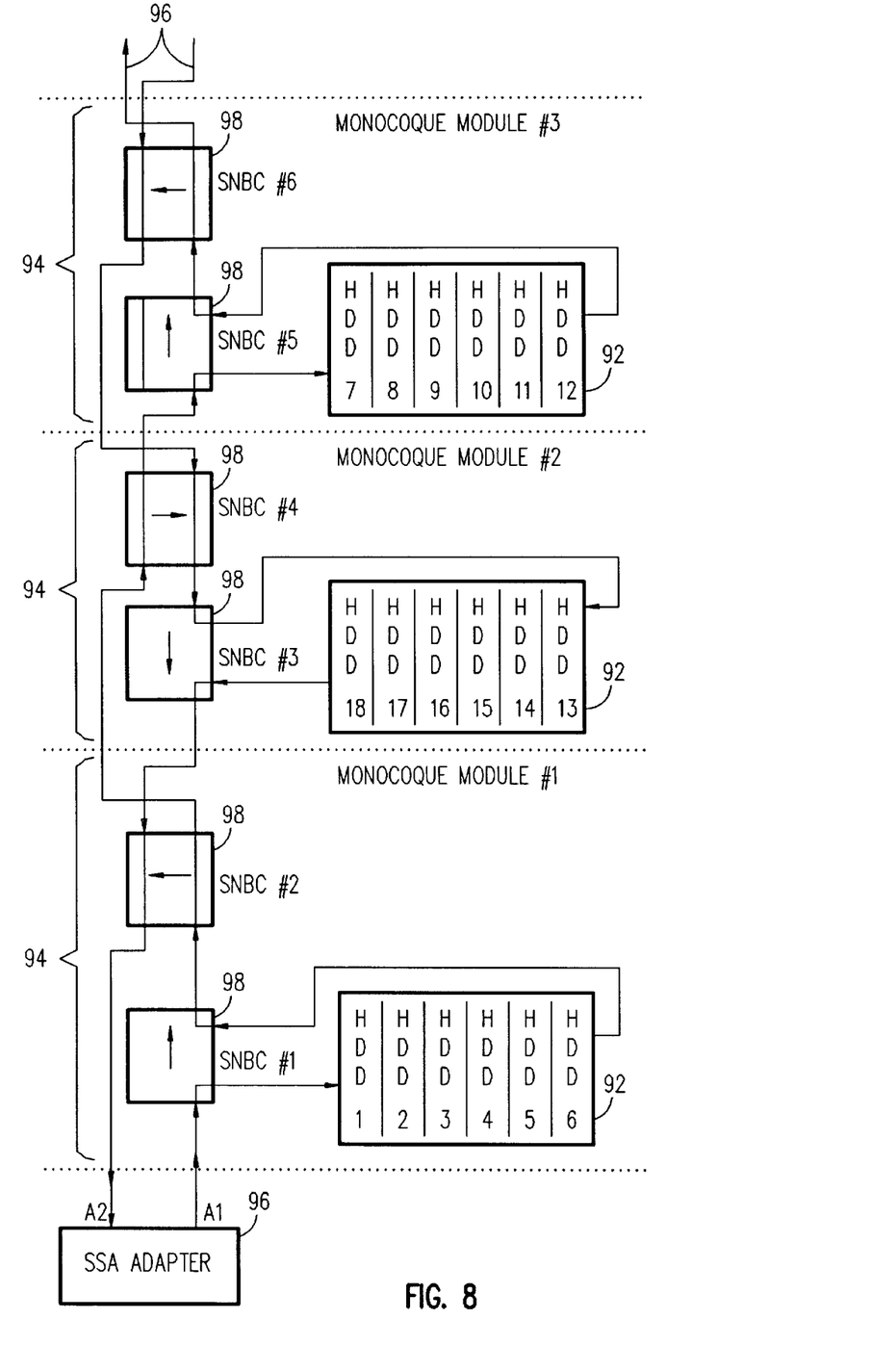
FIG. 8 is a diagram of data and command transmission connectors between the storage units.

FIG. 8 provides a diagram of the flow of data and commands between the set of disk drives 92 in the storage modules 94 and the host system using the SSA architecture for the data transmission. Each side of the storage module contains an SSA loop 96. FIG. 8 shows the left half of three stacked storage modules and the SSA loop A interconnections using SNBC switch function modules 98 to provide SSA path availability switching. The SNBC switch module is an existing function which stands for serial node bypass connection.

Referring to FIG. 8, SNBC switch number six is activated to make the SSA loop turn around at the module number three, top connection boundary. SNBC number six is deactivated when a storage module number four is installed (added to the system).

The SSA path interconnections are laced between the storage modules in order to limit the number of SSA connectors that would exist between driving and receiving HDD modules. SNBC switches number one, number three or number five activate if the adjacent SSA back plane needs to be removed for service. SNBC activation maintains the SSA loop A1 to A2 connectivity even though an SSA loop may be broken at any single point without loss of access to the HDDs on either side of the break.

HDDS are numbered 1 through 18 in their SSA drop sequence order numbers between SSA adaptor nodes A1 and A2. If storage module number three were removed, HDDs 13 through 18 would become HDDs 7 through 12 respectively. If storage module number four were installed its HDDs would be numbered 13 through 18 and the HDDs in module two would become HDDS 19 through 24.

Figure 9:
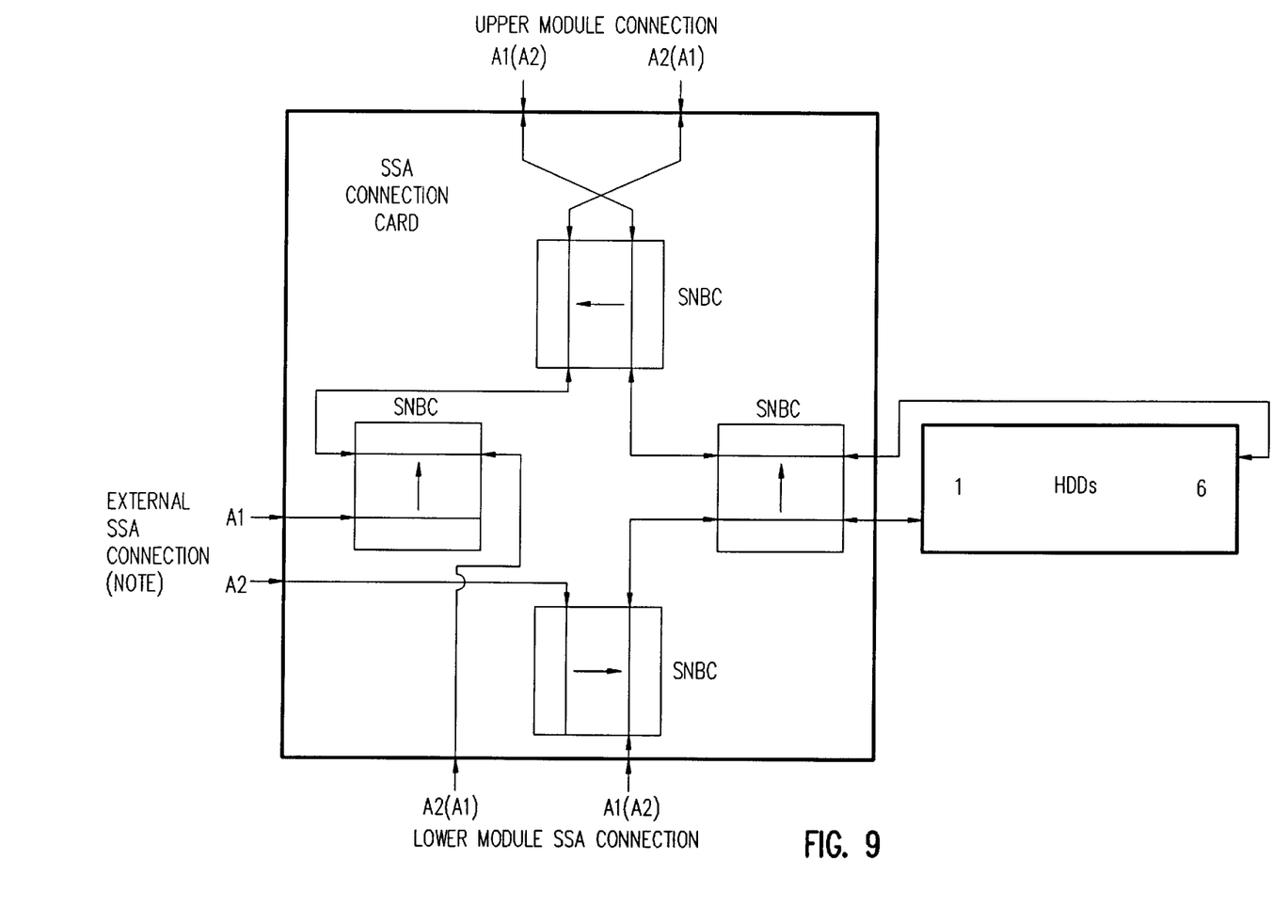
FIG. 9 is a diagram of a switching system in an SSA system.

As shown in FIGS. 8 and 9, external SSA connectors are used to connect the module stack to each of two SSA adapters 94 located in the rear of the storage module (not previously shown) between the fan assemblies (70 in FIG. 5) or in a host system. Additional SSA connections can be made to any module in the stack to start a new SSA loop. The SSA loop from the module below is terminated by the SNBC switch modules whenever an external connection is made.

Figure 10:
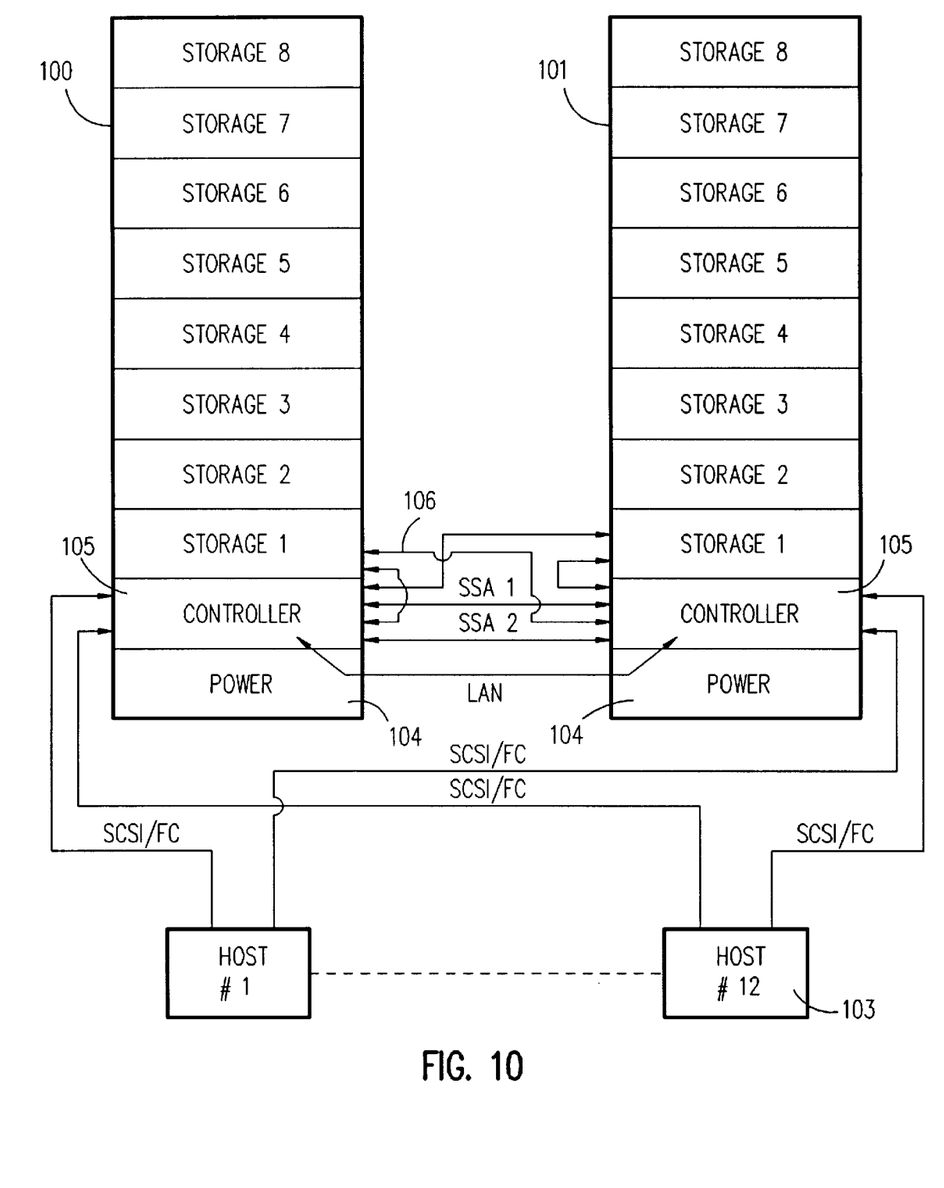
FIG. 10 is a diagram of multiple host attached multipath modular storage system including a controller unit.

Referring to FIG. 10, a first and second modular storage systems 100 and 101 are connected to a plurality of hosts 103. Each storage system has a base unit 104 containing a power supply, with a controller unit 105 stacked on top. The controller unit includes memory, cache, and processors for controlling the movement of data between the storage units and the host systems over a SCSI or Fiber Channel bus. As shown, the SSA loops 106 are dual initiators. Each controller has access to all data in both systems. The two controllers share status and configuration information via an Ethernet LAN (as an example). Each controller maintains configuration information for both storage stacks. Alternatively, a storage system including a controller can attach another storage system without a controller. In that case the SSA adapter is a single initiator capable of supplying a fast write operation through a non-volatile store.

The solution provided packages the hardware in such a way that it's capacity can be incrementally upgraded. This is accomplished by using a modular approach to package the hard disk drives and DC to DC converters into a modular frame and cover system. The cover unit is attached to the top of the last storage unit and provides the function of housing the operator status indicators which display the status of power, disk drives and cooling systems.

In one alternate embodiment, an SNBC switch is not used and the cover unit provides the external connections for the SSA loop A port 2 and loop B port 2. In such a system a cable would continue around the outside of the system to provide the connection in both directions.

The storage module provides an integrated frame and cover system to house the storage devices. One to N modules can be installed in a subsystem.

In the described embodiment each module provides two back planes that accommodate up to six hard disk drives. There are two DC to DC converters. Connection and pass through are provided for bulk DC supply A and B. Connection and pass through are also provided for the fault and sense data. Input and output is provided for the SSA loops A and B. Four cooling fans are also provided. The bulk DC, SSA, fault and sense cables are auto docked so that these connections are made to the storage modules as they are stacked into the subsystem. This allows quick and concurrent upgrade of the system capacity. All module components can be repaired or replaced without removing the module from the subsystem. The cooling in the storage modules is from front to back and provided by four fans to ensure redundancy in case of fan failure. Fan faults present an error code on the operator's status panel on the top unit.

The base unit provides a base for the subsystem to build from. The base houses the dual primary power system and dual bulk DC power supply used to power the storage modules.

To install a capacity upgrade an additional storage module is added to the subsystem. This is done by removing the cover unit. Where an SNBC switch is used, this will not break the SSA connection. The SSA architecture allows one side of the loop to be opened and still maintain data access to the attached hard disk drives. Once the storage module is in place the top unit is replaced and the SSA loops are restored to full operation. When a new module is attached, the SNBC switch breaks the loop and simultaneously closes the loop and renumbers the new storage devices accordingly as described previously.

The modules provide a cableless packaging concept which enables each module type to be built tested and shipped independently. Modules are field merged at the customer installation sites. The install process is simply to stack the modules and connect external cables. The addition or depletion of storage capacity is a customer task and is done without affecting host system access to existing online storage.

More specifically, a storage module is added to an existing storage stack by first removing the cover unit, stacking the new module on top of the upper most module, activating the inner locks which secure all electrical connections and then replacing the top unit. The new storage capacity is powered on and ready to be configured for use. If an existing module is only partially populated with HDDs, a new HDD can be added without affecting access to existing online data. With the exception of the controller module in a single controller configuration, and assuming RAID storage configuration, there is no single point of failure that will cause the loss of data or the loss of access to data. Any defective part can be replaced without causing any more disruption then caused by the original failure.

It will be understood by those skilled in the art that various modifications may be made without departing from the scope of the invention. Accordingly, it is understood that the invention is not limited by the specific illustrated embodiments, but rather by the scope of the appended claims.

We claim:

1. A storage system for storing electronic data used by a computer system, the storage system comprising:

a base unit comprising an enclosure, and a power source further comprised of at least two power supplies;

a plurality of modular units, each modular unit comprising an enclosure, a power connection system, a data transmission connection system, and a set of storage devices wherein a bottom wall of a first modular unit enclosure interfaces with a top wall of the base unit enclosure and a top wall of the first modular unit enclosure interfaces with a bottom wall of a second modular unit enclosure, wherein at least one modular unit is connected to the power source in the base unit through an adjacent modular unit;

a plurality of sets of storage devices, at least one set of storage devices positioned within each modular unit, each storage device having a storage media on which data is stored;

a plurality of backplanes wherein at least one back plane is positioned within each modular unit providing attachment for a set of storage devices to the power connection system and the data transmission connection system in the modular unit system, a data transmission system composing serial buses configured according to a Serial Storage Architecture for transmitting data and commands between the sets of storage devices in the modular units and the computer system, such that in the event of a loss of a connection between any one set of storage devices, data and commands can still be transmitted from and to any other set of storage devices; and a power supply system connecting each modular unit to the power source in the base unit providing power for the storage devices in each modular unit, wherein the storage devices in each modular unit are interconnected through the data transmission system and power supply system such that at least one new modular unit can be added to the storage system to increase storage capacity without disrupting operations of the storage system.

2. A storage system for storing electronic data used by a computer system, the storage system comprising:

a base unit comprising an enclosure, and a power source;

a plurality of modular units, each modular unit comprising an enclosure, a power connection system, a data transmission connection system, and a set of storage devices wherein a bottom wall of a first modular unit enclosure interfaces with a top wall of the base unit enclosure and a top wall of the first modular unit enclosure interfaces with a bottom wall of a second modular unit enclosure, wherein at least one modular unit is connected to the power source in the base unit through an adjacent modular unit;

a plurality of sets of storage devices, at least one set of storage devices positioned within each modular unit, each storage device having a storage media on which data is stored;

a plurality of backplanes wherein at least one back plane is positioned within each modular unit providing attachment for a set of storage devices to the power connection system and the data transmission connection system in the modular unit system;

a data transmission system for transmitting data and commands between the sets of storage devices in the modular units and the computer system, such that in the event of a loss of a connection between any one set of storage devices, date and commands can still be transmitted from and to any other set of storage devices;

a power supply system connecting each modular unit to the power source in the base unit providing power for the storage devices in each modular unit; and a fault indicator system, interconnecting the storage devices and an operator status indicator;

wherein the storage devices in each modular unit are interconnected through the date transmission system and power supply system such that at least one new modular unit can be added to the storage system to increase storage capacity without disrupting operations of the storage system.

3. The storage system of claim 2 further comprising a cover unit attachable to a top wall of each of the modular unit enclosures, wherein the operator status indicator is positioned on the cover unit.

4. The storage system of claim 2 further comprising a plurality of fan units in each modular unit and the base unit wherein the power supply system provides power for the fan units.

5. The storage system of claim 2 wherein the power supply system comprises dual power converters in the base unit and dual DC to DC converters in each modular storage unit.

6. The storage system of claim 2 further comprising a controller unit including a processor and memory, the controller unit providing for the management of the storage and retrieval of data in the storage devices.

7. The storage system of claim 2 further comprising dual power supply systems, dual fan systems, dual data transmission systems, and each modular unit contains at least two backplanes connecting two sets of storage devices.

8. The storage system of claim 2 further comprising removable panels on at least one side wall of the modular unit enclosure such that the storage devices and power system components can be serviced, added and removed from the modular unit without removing any modular units from the storage system.

* * * * *